United States Patent
Yang et al.

(10) Patent No.: US 10,824,706 B2
(45) Date of Patent: Nov. 3, 2020

(54) PORTABLE ELECTRONIC DEVICE FOR AUTHENTICATING USER AND SYSTEM AND METHOD ASSOCIATED THEREWITH

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Guowen Yang, Beijing (CN); Mingguang Zheng, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 189 days.

(21) Appl. No.: 16/154,239

(22) Filed: Oct. 8, 2018

(65) Prior Publication Data
US 2019/0236251 A1 Aug. 1, 2019

(30) Foreign Application Priority Data
Feb. 1, 2018 (CN) .......................... 2018 1 0102167

(51) Int. Cl.
*G06F 21/32* (2013.01)
*G06F 21/44* (2013.01)
(Continued)

(52) U.S. Cl.
CPC .............. *G06F 21/32* (2013.01); *G06F 21/44* (2013.01); *H04L 63/0861* (2013.01); *H04W 12/06* (2013.01); *G06F 21/35* (2013.01)

(58) Field of Classification Search
None
See application file for complete search history.

(56) References Cited

U.S. PATENT DOCUMENTS

| | | | | |
|---|---|---|---|---|
| 9,195,834 | B1 * | 11/2015 | Jakobsson | H04L 9/0891 |
| 2002/0097142 | A1 * | 7/2002 | Janiak | G06K 9/00006 |
| | | | | 340/5.53 |

(Continued)

FOREIGN PATENT DOCUMENTS

| CN | 105574949 A | 5/2016 |
|---|---|---|
| CN | 106156701 A | 11/2016 |

(Continued)

OTHER PUBLICATIONS

First Office Action and English language translation, CN Application No. 201810102167.7, dated Jan. 15, 2020, 29 pp.

*Primary Examiner* — Benjamin E Lanier
(74) *Attorney, Agent, or Firm* — Myers Bigel, P.A.

(57) ABSTRACT

The present disclosure relates to a portable electronic device for authenticating a user through a management device and a system and method associated therewith. The portable electronic device includes a collector, an authentication information generator and a communication interface. The collector is configured to collect biometric data of a user. The authentication information generator is configured to generate authentication information according to whether the portable electronic device is within an area pre-set by the management device and based on the biometric data collected by the collector in real time. The communication interface is configured to send the generated authentication information to the management device so as to authenticate whether the user is a registered user of the management device. By collecting relevant data in a distributed manner during the user authentication process, user authentication efficiency is improved, and risk of damage to data collection equipment is reduced.

19 Claims, 4 Drawing Sheets

(51) Int. Cl.
*H04W 12/06* (2009.01)
*H04L 29/06* (2006.01)
*G06F 21/35* (2013.01)

(56) References Cited

U.S. PATENT DOCUMENTS

| | | | | |
|---|---|---|---|---|
| 2005/0255840 | A1* | 11/2005 | Markham | H04W 12/06 455/422.1 |
| 2007/0040017 | A1* | 2/2007 | Kozlay | H04L 9/3234 235/380 |
| 2013/0173925 | A1* | 7/2013 | Yen | G06F 21/32 713/186 |
| 2014/0189435 | A1* | 7/2014 | Manuel-Devadoss | G06F 11/3495 714/43 |
| 2015/0106291 | A1* | 4/2015 | Robinson | G06Q 10/0838 705/339 |
| 2016/0292741 | A1* | 10/2016 | Rankin | H04W 4/08 |
| 2017/0236397 | A1* | 8/2017 | Myslenski | G08B 21/0453 348/143 |
| 2019/0213311 | A1* | 7/2019 | Tussy | G07C 9/00 |

FOREIGN PATENT DOCUMENTS

| | | |
|---|---|---|
| CN | 106846523 A | 6/2017 |
| CN | 106898259 A | 6/2017 |

\* cited by examiner

PORTABLE ELECTRONIC DEVICE FOR AUTHENTICATING USER AND SYSTEM AND METHOD ASSOCIATED THEREWITH

RELATED APPLICATION

The present application claims the benefit of Chinese Patent Application No. 201810102167.7, filed on Feb. 1, 2018, the entire disclosure of which is incorporated herein by reference.

TECHNICAL FIELD

The present disclosure generally relates to the technical field of electronic devices, and more particularly to a portable electronic device for authenticating a user and a system and method associated therewith.

BACKGROUND ART

In today's social life, more and more affairs require the authentication of a personal identity. For instance, a badge, as an employee's identification, has become an integral part of each enterprise. A current badge is usually in a form of a card integrated with such functions as attendance record, access control and dining payment. A typical badge, however, is just an independent magnetic induction card that needs to cooperate with a clocking-in machine to function, which is inconvenient. Moreover, identity authentication is performed according to personal information stored in the badge, so it is possible to see a badge be fraudulently used or occur identity theft.

With the development of technologies, there also occur approaches in which attendance check is conducted by means of fingerprint identification, which, however, usually needs to install a fingerprint clocking-in machine. Since all the employees of an enterprise have to clock in one by one on the fingerprint clocking-in machine, the employees have to wait a long time for clocking in due to the large number at a clocking-in peak period (such as attendance time), and excessive use in a short time will damage the fingerprint clocking-in machine.

SUMMARY

The present disclosure provides a portable electronic device for authenticating a user through a management device and a relevant system and method thereof.

In one aspect, according to the embodiments of the present disclosure, a portable electronic device for authenticating a user through a management device comprises a collector, an authentication information generator and a communication interface. The collector is configured to collect biometric data of the user. The authentication information generator is configured to generate authentication information according to whether the portable electronic device is within an area pre-set by the management device and based on the biometric data collected by the collector in real time. The communication interface is configured to send the generated authentication information to the management device so as to authenticate whether the user is a registered user of the management device.

In some embodiments, the portable electronic device further comprises a memory configured to store the biometric data of a designated holder of the portable electronic device, and the designated holder is a registered user of the management device. The authentication information genera-tor further comprises a comparator configured to compare the collected biometric data with the biometric data of the designated holder to determine whether they match with each other when the portable electronic device is determined to be within the area pre-set by the management device. The authentication information generator is configured to include an indication of successful authentication in the generated authentication information when a result of comparison indicates that the collected biometric data matches with the biometric data of the designated holder.

In some embodiments, the portable electronic device further comprises a positioner configured to trace the position of the portable electronic device. The authentication information generator is also configured to determine whether the portable electronic device is within the pre-set area based on the position obtained from the positioner.

In some embodiments, the communication interface comprises a short-range wireless interface and is configured to provide a connection-establishment indication to the authentication information generator when it establishes a communication connection with the management device via the short-range wireless interface. The authentication information generator determines that the portable electronic device is within the pre-set area based on the indication.

In some embodiments, the indication of successful authentication comprises an indication of successful position authentication and an indication of successful, biometric data authentication.

In some embodiments, the communication interface is also configured to receive configuration information and/or a notification message from the management device. The configuration information comprises identification information that is specific to the registered user of the portable electronic device. The portable electronic device further comprises a display unit configured to display the identification information and/or notification message.

In some embodiments, the configuration information comprises a template to be used for the identification information and/or notification message. The display unit is configured to display the identification information and/or notification message according to the template.

In some embodiments, the collector is also configured to collect the biometric data of the user after the display unit displays the notification message. The communication interface is configured to send the collected biometric data to the management device as a feedback on the notification message.

In some embodiments, the portable electronic device comprises a housing, and a socket and a collection area that are disposed on a surface of the housing. The socket is configured to automatically turn on the portable electronic device when a hanging rope is inserted therein. The collection area is configured to collect the biometric data of the user when the user gets closer to or contacts the area.

In some embodiments, the portable electronic device is in a form of a card.

In another aspect, according to the embodiments of the present disclosure, a system for authenticating a user comprises a portable electronic device as stated above and a management device. The management device is used to authenticate whether the user is a registered user thereof according to the authentication information from the portable electronic device.

In a further aspect, according to the embodiments of the present disclosure, a method for using a portable electronic device to authenticate a user through a management device comprises the steps of: obtaining the biometric data of the user collected in real time, generating authentication information according to whether the portable electronic device is within an area pre-set by the management device and based on the collected biometric data, and sending the authentication information to the management device to authenticate whether the user is a registered user of the management device.

In some embodiments, biometric data of a designated holder of the portable electronic device is stored in the portable electronic device, and the designated holder is a registered user of the management device. When the portable electronic device is determined to be within the area pre-set by the management device, the collected biometric data is compared with the biometric data of the designated holder. When a result of comparison indicates that the collected biometric data matches with the biometric data of the designated holder, the generated authentication information comprises an indication of successful authentication.

In some embodiments, a positioner is used to trace the position of the portable electronic device. It may be determined whether the portable electronic device is within the pre-set area based on the position obtained from the positioner.

In some embodiments, the portable electronic device transmits the authentication information to the management device via a short-range wireless communication interface. When the portable electronic device establishes a communication connection with the management device via the short-range wireless interface, it can be determined that the portable electronic device is within the pre-set area.

In some embodiments, configuration information and/or a notification message may be received from the management device. The configuration information comprises identification information specific to the registered user of the portable electronic device. The identification information and/or notification message may be displayed.

In some embodiments, the configuration information comprises a template to be used for the identification information and/or notification message, and the identification information and/or notification message may be displayed in accordance with the template.

In some embodiments, the biometric data of the user may be collected after the notification message is displayed, and the collected biometric data may be sent to the management device as a feedback on the notification message.

In still further aspect, according to the embodiments of the present disclosure, a computer program product is embodied on a non-transitory computer readable medium and comprises machine readable instructions. When the machine readable instructions are being executed on a computing system, the computing system executes the steps of a method as described above.

In still further aspect, according to the embodiments of the present disclosure, a portable electronic device for authenticating a user through a management device comprises a memory and a processor. The memory is for storing computer executable instructions. The processor is configured to, when executing the computer executable instructions, cause the portable electronic device to execute the steps of a method as described above.

According to the embodiment of the present disclosure, the portable electronic device collects data related to a user and then sends the authentication information to the management device, which alleviates the pressure of centralized authentication by the management device and reduces the risk of equipment damage.

BRIEF DESCRIPTION OF DRAWINGS

The above-mentioned and additional objects, features and advantages of the embodiments of the present disclosure can be better understood according to the illustrative and non-limiting detailed description of the embodiments of the present disclosure with reference to the drawings.

All the drawings are illustrative, not drawn to scale, and usually just show the parts necessary for explaining the present disclosure. Other parts may be omitted or implied only.

DETAILED DESCRIPTION

For explanation, rather than limitation, the following depiction states some particular details of the disclosed embodiments, such as the system structure, interface and technologies, so that the invention can be clearly and thoroughly understood. Those skilled in the art, however, should readily understand that, without seriously departing from the spirit and scope of the present disclosure, the present disclosure can be implemented according to other embodiments that do not precisely conform to the details described herein. Moreover, in the context, for the sake of brevity, detailed description of some known equipments, circuits and methods are omitted so as to avoid redundant details and possible confusions.

Various embodiments provide a portable electronic device for authenticating a user through a management device and a system and method associated therewith. The portable electronic device is used to send the biometric data of the user collected in real time to the management device for authenticating the user when the portable electronic device is within a pre-set area. The authentication result may be used for any suitable function, such as attendance check and access control, and functions involving various tickets, like an entrance ticket, annual pass or library card, etc.

Figure 1:
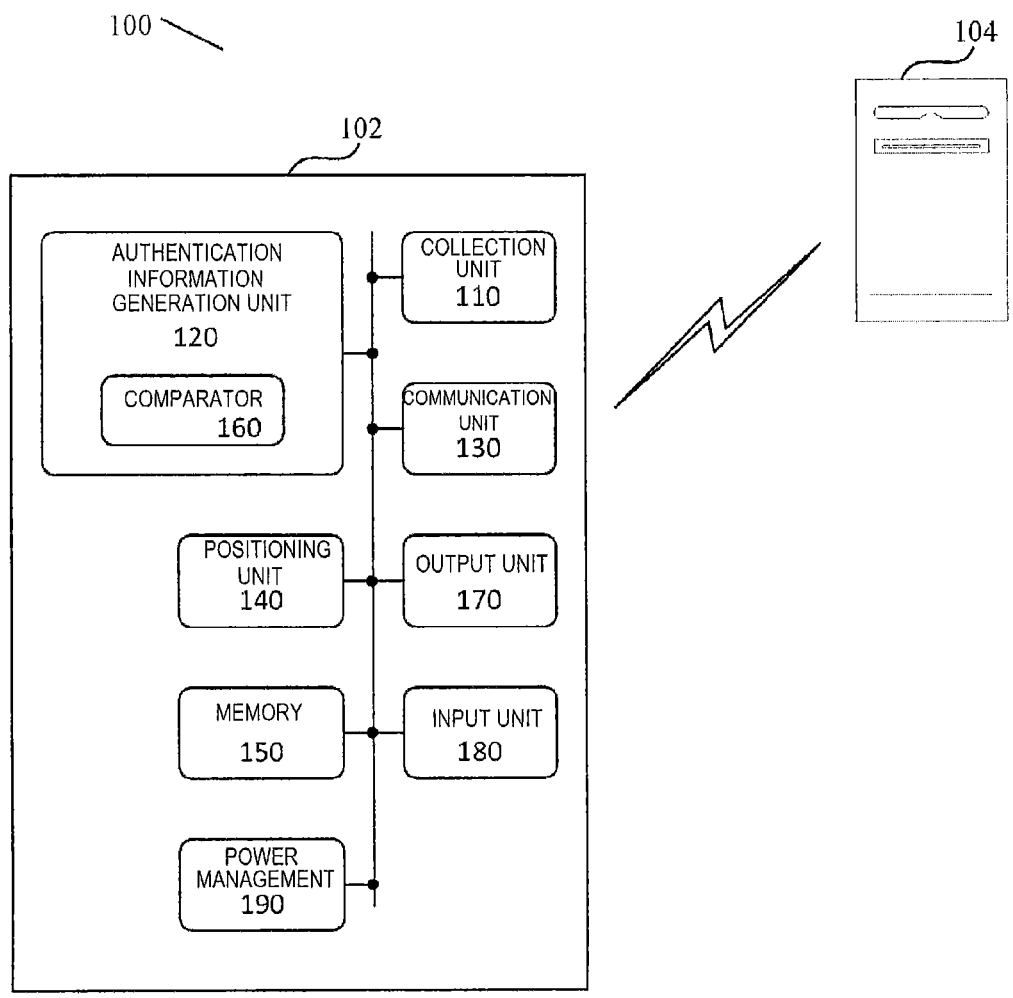
FIG. 1 illustrates an exemplary system for authenticating a user according to the embodiment of the present disclosure.

FIG. 1 illustrates an exemplary user authentication system 100 according to the embodiment of the present disclosure. The user authentication system 100 comprises a portable electronic device 102 and a management device 104. The portable electronic device 102 is used for authenticating a user through the management device 104, e.g., for judging whether the user is a registered user of the management device 104, such as, a designated holder of the portable electronic device 102.

As depicted, the portable electronic device 102 may comprise a collection unit 110, an authentication information generation unit 120 and a communication unit 130.

The collection unit 110 may be used to collect the biometric data of a user. In some embodiments, the collection unit 110 is configured to collect the biometric data only if the portable electronic device 102 is within a certain area. The biometric data may comprise e.g., identification data of fingerprints, irises, faces or even veins. The collection unit 110 may comprise a fingerprint identification unit for collecting fingerprint information (including an optical sensor, a CMOS sensor, a thermosensitive sensor, an ultrasonic sensor, etc.), a camera for obtaining an iris or facial image, or a vein identification instrument or an infrared CCD camera for obtaining a finger venous distribution map, etc.

The authentication information generation unit 120 may generate authentication information based on the biometric data collected by the collection unit 110. In some embodiments, the authentication information generation unit 120 generates the authentication information according to whether the portable electronic device 102 is within the area pre-set by the management device 102 and based on the biometric data collected by the collection unit 110 in real time. Herein, the area is an area pre-set by the management device 104. The authentication information generation unit 120 may be a hardware assembly, or a software module executed by a processor. The hardware assembly may comprise a micro-processor device, a digital signal processor (DSP) device, a field programmable gate array (FPGA) device, an application specialized integrated circuit (ASIC), a system-on-chip (SOC), a programmable logic device (PLD), etc. The software module may comprise a computer program.

The communication unit 130 may be used to support the communication with the management device 104. The communication unit 130 may send the authentication information generated by the authentication information generation unit 120 to the management device 104 so as to authenticate whether the user is a registered user of the management device 104. In an example, the designated holder of the portable electronic device 102 may be registered as a user of the management device. The communication unit 130 may also receive information and/or messages from the management device 104. In some embodiments, the communication unit 130 may comprise a wired interface and/or a wireless interface. The wired interface may comprise, e.g., a universal serial bus (USB) interface. The wireless interface may comprise a wireless interface capable of swapping data in a short range. For example, the wireless interface may be a Bluetooth standard-based interface. On the other hand, the wireless interface may be an IEEE 802.11 standard-based interface, namely, a Wi-Fi interface. Further, the wireless interface may also comprise a near field communication (NFC) interface established based on NFC standard. The wireless interface may also comprise an interface for communication with a mobile communication network.

According to the embodiment of the present disclosure, the portable electronic device collects user-related data and then sends the authentication information to the management device, which alleviates the pressure of centralized authentication on the management device and reduces the risk of equipment damage.

The pre-set area may be a certain geographical area or an area delimited by a distance from a certain reference. Exemplarily, in a scene of work attendance check in a company, the management device 104 may pre-set the area to be the office area of the company. Since the work attendance check is aimed to prove that an employee has arrived at the company in person, this would make collection and sending of the biometric data be enabled on a condition that the user carrying the portable electronic device has arrived at the company. Similarly, in a scene of entrance ticket check in a park, the management device 104 may pre-set the area to be an area that is, e.g., less than 1 meter away from the ticket barrier of the park. Since the ticket check is aimed to prove that a tourist has arrived at the park in person, this may ensure that the collected and sent biometric data belong to the person who has arrived at the park.

The portable electronic device according to the embodiment of the present invention enables to collect the biometric data of a user in real time when it is within a pre-set range and provide relevant information in a distributed manner. This not only ensures that the collected biometric data meets the requirements for territoriality and timeliness, but also avoids the bottleneck of data collection and large damage to data-collecting apparatuses during data collection, especially in peak period.

As shown in FIG. 1, in some embodiments, the portable electronic device 102 may also comprise a positioning unit 140 for tracing the position of the portable electronic device 102. The positioning unit 140 may support a suitable positioning technology, such as GPS or other global navigation system. For instance, the positioning unit 140 may comprise a wireless receiver (e.g., a GPS receiver or a cellular receiver) so as to receive wireless signals broadcasted from a satellite and/or a ground base station. These wireless signals may be used to identify an absolute or relative position of the portable electronic device 102. The authentication information generation unit 120 may determine whether the portable electronic device 102 has entered into the pre-set area by obtaining the current position of the portable electronic device 102 from the positioning unit 140. For example, the determination may be done by comparing the identified absolute geographical position with the pre-set geographical area. Alternatively, the determination may also be done by comparing the identified relative distance from a reference with a pre-set distance range.

In some embodiments, the communication unit 130 may comprise a short-range wireless interface, and the pre-set area is defined as an area in which the communication unit is capable of conducting short-range to communication with the management device. Therefore, the communication unit 130 is configured to provide a connection-establishment indication to the authentication information generation unit 120 when it establishes a communication connection with the management device 104 via the short-range wireless interface. The authentication information generation unit 120 may determine whether the portable electronic device 102 is within the pre-set area based on the indication. At this point, the authentication information generation unit 120 may obtain the collected biometric data from the collection unit 110 to generate the authentication information. Upon generation, the authentication information is sent via the communication unit 130. Since no stand-alone positioning unit is needed in such a solution, the cost of equipment is saved.

In some embodiments, the communication unit 130 may also be used to receive the information and/or message from the management device 104, including, e.g., the configuration information and/or notification message specific to the registered user of the portable electronic device 102, such as the designated holder. In an embodiment, the configuration information may comprise the identification information, including, e.g., the identity information and biometric information, of the designated holder of the portable electronic device 102, which make it easy to change the designated holder of the portable electronic device 102. For example, when an original designated holder resigns or changes the department within a company, the communication unit 130 may receive new configuration information from the management device 104 so as to designate a new holder for the portable electronic device 102 or update the relevant information of the holder. In some embodiments, the communication unit 130 may also receive configuration commands from the management device 104. The portable electronic device 102 will act on the configuration information therein based on these configuration commands, such as adding, modifying or deleting the holder's information. In an example, when the designated holder of the portable electronic device 102 resigns or the portable electronic device 102 is lost, the management device 104 may send a deletion command to the portable electronic device 102 to delete the holder's information from the portable electronic device 102, thereby avoiding the fraudulent use or misappropriation of the portable electronic device 102 by someone maliciously. The provision of the configuration information and/or configuration command enables the portable electronic device to be flexibly configured and controlled by the management device, which improves the convenience and security of the portable electronic device in use.

In some embodiments, the notification information may be, e.g., a broadcast message, or a multicast or unicast message to the electronic card sent by the management device 104. In an example, in a scene of work attendance check in a company, the notification message may comprise, e.g., notifications at all levels, including a company notification, a department notification, a personal notification, or various types of notifications, such as a meeting notification, a human resources notification, or a security notification. In another example, in a scene of entrance ticket check in a park, the notification message may comprise a park's open schedule notification, a special activity notification, a notification of business information in vicinity, etc.

In some embodiments, the portable electronic device 102 also comprises a memory 150. The memory 150 may store reference authentication information. The reference authentication information is trusted authentication information serving as a reference, which may comprise information of an area pre-set by the management device, e.g., geographical coordinates of a geographical area or a threshold distance from a reference object. Alternatively or additionally, the reference authentication information may comprise information of a designated holder, such as the biometric data and/or other personal information of the designated holder, including image information or text information. In some embodiments, a secure storage part in the memory 150 is used as a storage unit for storing reference authentication information. The secure storage part may be locked so as to be accessible by a trusted entity only. In some embodiments, only if the portable electronic device 102 connects with the management device via a wired interface may the reference authentication information be written into the secure storage part of the memory 150. As such, the reference authentication information stored in the memory 150 may not be tampered, thereby increasing its security. The memory 150 comprises a computer storage medium included in the portable electronic device 102 as a tangible and/or physical medium, including, but not limited to, a random-access memory (RAM), a static random-access memory (SRAM), a dynamic random-access memory (DRAM), a read-only memory (ROM), or any other memory storage device, storage apparatus and/or storage medium for storing and maintaining information accessible by a computing device.

In some embodiments, the designated holder may use the portable electronic device 102 to register with the management device 104 as a user thereof. During the registration, the biometric data of the designated holder may be collected via the collection unit and stored as the reference authentication information. The collected biometric data of the designated holder may be stored locally in the portable electronic device 102 or sent to the management device. 104 to be stored remotely. The collected biometric data may be stored in association with an identifier of the designated holder or the portable electronic device.

In some embodiments, the authentication information generation unit 120 comprises a comparator 160 used to compare a first biometric data of the designated holder stored in the memory 150 with a second biometric data of a user collected by the collection unit 110 in real time when the portable electronic device is determined to be within the area pre-set by the management device, so as to determine whether the first biometric data matches the second biometric data. When a match is determined, the user is authenticated as the designated holder, i.e., the registered user, of the portable electronic device. Based on a result of comparison indicative of a match from the comparator 160, the authentication information generation unit 120 may include an indication of successful authentication in the generated authentication information, such that the management device 104 may authenticate the user as a registered user of the management device 104 based on the indication. The indication of successful authentication may be a general indication of successful authentication, or may include an indication of successful position authentication and an indication of successful biometric data authentication respectively. By authenticating the user's biometric data in the portable authentication device 102, it is possible to authenticate users in a distributed manner, which further avoids the communication and processing pressure on the management device at the time of centralized authentication and thereby further improves the efficiency of user authentication.

In some embodiments, instead of authenticating the collected biometric data, the portable electronic device 102 sends the collected biometric data itself as the authentication information to the management device 104. The management device 104 performs the user authentication according to the collected biometric data.

In some embodiments, the authentication information may also comprise other associated information, such as the time or position of biometric data collection, and/or the identifier of the portable electronic device 102 or the identity of the designated holder thereof, etc. The management device 104 may use the associated information for suitable functionalities. For example, in a scene of work attendance check, the management device 104 may determine whether a user comes to work late or leaves early based on the collected time; and in a scene of entrance ticket check in a park, the management device 104 may conduct a statistical analysis of the users' visiting habits based on the collected time is and/or positions.

In some embodiments, the portable electronic device 102 also comprises an output unit 170 for outputting the information or message to the user. The information or message may be configuration information and/or a notification message received from the management device 104, or information generated by the portable electronic device 102 itself. In some embodiments, the output unit 170 may comprise a display unit used to display the identity information of the designated holder of the portable electronic device 102. The identity information may comprise image information, such as a profile photo or picture of the designated holder, and/or text information, such as the name, number or other suitable information of the designated holder. In some embodiments, the display unit may display the identity information as a main display page, namely a default display page. In an example, the display unit may display the information and/or message according to a template. The template may be included in the configuration information sent by the management device and may be designed, customized or modified by a generator of the configuration information or notification message. Alternatively or additionally, the template may also be customized or selected by the designated holder of the portable electronic device 102. The display unit may display or update the main display page according to the template. In this manner, the user interface of the portable electronic device 102 becomes friendlier. In an embodiment, the display unit may display the notification message as an auxiliary display page, and may switch the main display page to the auxiliary display page at the time of receiving to the notification message via the communication unit 130. In an embodiment, the display unit may select different colors to indicate the types of messages according to the displayed content. The display unit may be, e.g., an OLED or LCD display screen, and screens of different display sizes and different display resolutions may be selected as required. Alternatively or additionally, the output unit 170 may also be an output device of other kind, such as an audio output device (speaker) or other tactile output device (vibrator).

In some embodiments, after the portable electronic device 102 receives the notification message from the management device, the collection unit 110 also collects the user's biometric information as a feedback to the notification message, such as a return receipt, and sends the feedback to the management device via a notification unit. The use of the biometric data as the feedback to the message enhances the accuracy and authenticity of the feedback to the message.

In some embodiments, when the management device 104 performs the user authentication, the communication unit 130 is also configured to receive the authentication result from the management device 104. The display unit may display the authentication result to the user so as to indicate to the user whether the authentication is successful. In some embodiments, after the display unit displays the notification message, the collection unit 110 may collect the biometric data of the user. The collected biometric data is sent as the feedback to the notification message to the management device 104 via the communication unit 130.

In some embodiments, the portable electronic device 102 may also comprise an input unit 180 for receiving the user's input. Some functionalities of the portable electronic device 102, including turning on/off the portable electronic device 102, activating the display of the display unit or customizing the display interface, etc., may be triggered in response to the user's input. Exemplarily, after the display unit displays the notification message, the input unit 180 may receive a user input indicating that the message is read and a feedback is to be sent. The collection unit 110 may be turned on to collect the biometric data in response to this user input. The input unit 180 may comprise a keypad, a touch screen, and the like.

In some embodiments, the portable electronic device 102 may also comprise a power management unit 190 for providing power to the portable electronic device 102 and/or managing charging of a rechargeable battery in the portable electronic device 102. The power management unit 190 may turn on or turn off the portable electronic device 102 in response to the user's input from the input unit 180 or other triggering events.

In some embodiments, as shown, each unit may be operatively coupled via, e.g., a bus structure for executing, such as, data processing, input/output processing, power control and/or other functions.

The portable electronic device 102 according to the embodiment of the present disclosure may include, but is not limited to, a mobile device, such as a mobile phone, a personal digital assistant (PDA) and a tablet, or a wearable device, such as a smart watch and a smart hand ring, etc. The portable electronic device 102 may also be a specialized electronic device, such as an e-card.

Figure 2:
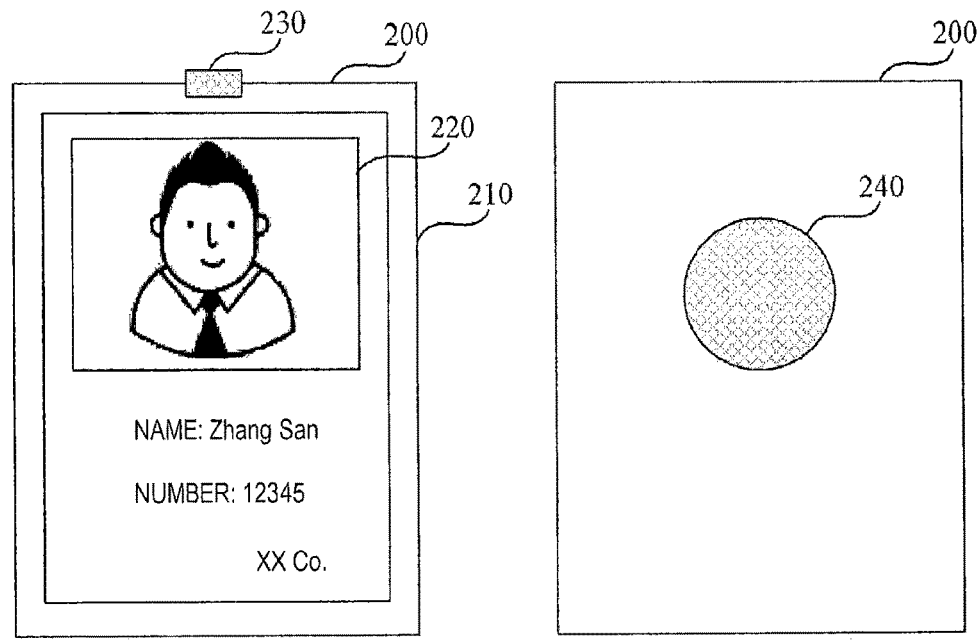
FIG. 2 illustrates an exemplary portable electronic device according to the embodiment of the present disclosure.

FIG. 2 shows a schematic view of a portable electronic device according to the embodiment of the present disclosure. In FIG. 2, the portable electronic device is exemplified in a form of an e-card 200. FIG. 2 shows the front view of the e-card 200 in the left side and the rear view of the e-card 200 in the right side. The e-card 200 may comprise a housing 210, a display area 220, an interface part 230 and a collection area 240 which is exemplified as a fingerprint identification area.

The housing 210 may have a relatively small shape, and may be made of plastic, metal, a composite material or any combination thereof. Further, the housing 210 may be made by such processes as a stamping process, a molding process, an injection molding process and a die casting process. Although the housing 210 is exemplified as a rectangular card, it may be understood that it may be in any suitable shape, such as circle, oval or other aesthetic shape, or even sphere, ellipsoid or other aesthetic shape.

The display area 220 is used to display text and/or image information. The information may be displayed in black and white, or in color. The display area 220 may be implemented by a displayer, such as an OLED/LCD screen. The display area 220 may be selected to have different sizes or different resolutions as required. Exemplarily, the display area 220 is arranged on the front side of the e-card 200. The displayed information may comprise the identification information related to the holder of the e-card 200, such as the profile photo or picture of the holder, and/or the name, number or company of the holder. The displayed information may also comprise the information related to the e-card 200, such as the issuing time, expiration date and applicable range of the e-card. Alternatively or additionally, the e-card 240 may also comprise an acoustic output area for outputting information or a message in an audio form.

The interface part 230 is used to connect the e-card 200 to an external device. The external device may comprise the management device. The interface part 230 may be used to enable to download data from the management device and/or upload data to the management device. In an embodiment, the interface part 230 may comprise a socket, into which a hanging rope may be inserted to facilitate the wearing of the e-card. Additionally, the portable electronic device may be turned on/off in response to insertion of the hanging rope into the socket or withdrawal of the handing rope from the socket. In some embodiments, the interface part 230 may comprise a charging interface to connect a m power cord so as to provide power to the e-card 200 or charge the rechargeable battery (not shown) in the e-card 200. Additionally, the interface part 230 may also serve as a data interface to connect a data line so as to enable data exchange between the e-card 200 and the external device. For instance, the interface part 230 enables configuration files to be loaded from the external device to the e-card 200 so as to modify or update the configuration of the e-card, such as modify or update the information to be displayed in the display area 220. Additionally, the interface part 230 also enables to upload the identification information related to the holder of the e-card, etc., to the external device. In an embodiment, the interface part 230 may be arranged at the edge of the e-card 200, such as the upper edge of the e-card 200. Alternatively, the interface part 230 may be arranged in any suitable position of the e-card 200.

The fingerprint identification area may be configured to collect the user's fingerprint. The fingerprint identification area may be arranged on the surface of the e-card 200, such as on the back side of the e-card 200. It could be understood that the collection area may be represented in other form, dependent on the type of the collected biometric data. For example, when collecting facial data, the collection area may be equipped with a camera for capturing a user's facial image.

The e-card 200 may be attached to a user in any suitable form. In some embodiments, the e-card 200 may be worn in any suitable position relative to a user. For example, the e-card 200 may be hung in front of chest of a user by an attachment mechanism in a form of a hanging rope. Alternatively or additionally, the e-card 200 may be attached to the user's clothes or other objects carried by the user through a peg-shaped fastening device operating in a way similar to a clothes peg.

It could be understood that although the portable electronic device in FIG. 2 is exemplified as an e-card, the portable electronic device is not limited thereto and may be in any suitable form, such as a mobile device or a wearable device.

Figure 3:
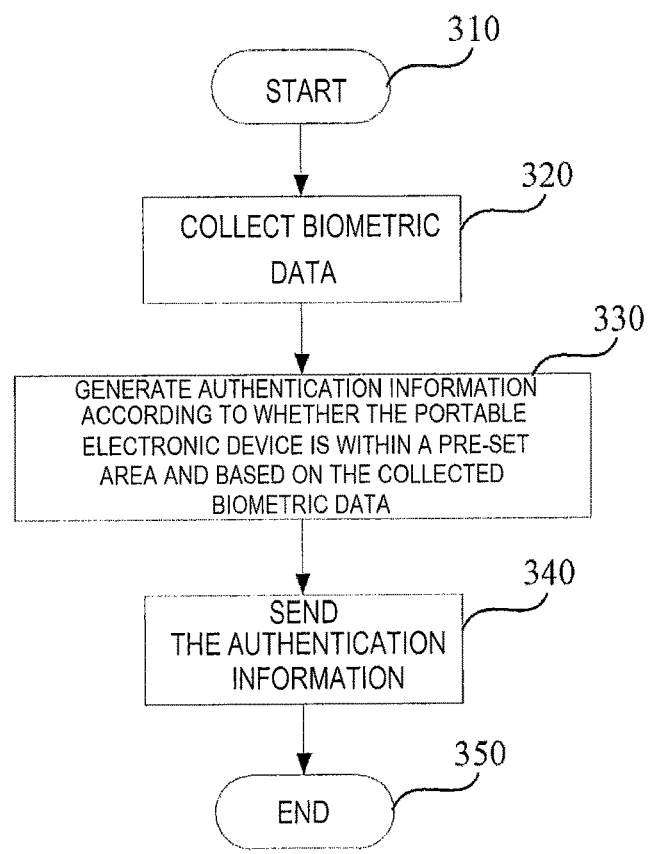
FIG. 3 illustrates a flow chart of an exemplary process according to the embodiment of the present disclosure.

FIG. 3 illustrates the flow chart of an exemplary process 300 for authenticating a user through the management device by the portable electronic device.

The process starts at 310, where the portable electronic device is in an ON state or enters into an ON state from an OFF state. In an embodiment, the e-card is taken as an example. When in an OFF state, the e-card may enter into the ON state by detecting insertion of a handing rope in its socket. Alternatively, the e-card may enter into the ON state by receiving other forms of turn-on input, such as a key input. In an embodiment, the e-card, after being turned on, may display its main display interface, such as the personal information of the e-card holder, including the profile photo and name of the holder. Exemplarily, when the e-card is used as a work card, the main display page may also display at least one of the holder's company name, department name and work number. In the event that the e-card is used as a park annual pass, the main display page may also display the issuing time and expiration date of the e-card.

In 320, the biometric data is collected. In some embodiments, it may be determined whether the portable electronic device is within a pre-set area before the collection of the biometric data, and the biometric data may be collected when the portable electronic device is determined to be within the pre-set area. In an embodiment, when the portable electronic device is within the pre-set area, the user may be prompted that the biometric data may be collected. In some embodiments, it may be determined whether the portable electronic device enters into the pre-set area by obtaining the current position of the portable electronic device and comparing the current position with the pre-set area. In another embodiment, it may be determined whether the portable electronic device enters into the pre-set area by judging whether the portable electronic device successfully establishes a communication connection with the management device. Alternatively, the determination of whether the portable electronic device is within the pre-set area may be done at the same time of or after the collection of the biometric data.

In 330, the authentication information is generated. The authentication information may be generated according to whether the portable electronic device is within the pre-set area and based on the biometric data collected in real time. In some embodiments, the biometric data may be collected when the portable electronic device is within the pre-set area. In an example, the authentication information may comprise the collected biometric data itself. In another example, the authentication information may also comprise a result of user authentication based on the collected biometric data. In some embodiments, the collected biometric data may be compared with the biometric data of a designated holder stored in the portable electronic device. The biometric data of the designated holder may be trusted fingerprints collected and stored when a user is registered with the management device. Accordingly, the result of authentication may indicate: the collected biometric data belongs to the designated holder of the portable electronic device, and then the user is a registered user recognized by the management device. In some embodiments, the authentication information further comprises other information applicable to expected functionalities. For example, the authentication information may also comprise at least one of time and location of biometric data collection and an identifier of the portable electronic device.

In 340, the authentication information is sent. In an embodiment, the authentication information is sent to the management device so as to authenticate whether the user is a registered user of the management device, such as the designated holder of the portable electronic device. When the authentication information is the collected biometric data itself, the authentication is done by the management device. At this point, the result of authentication is returned to the portable electronic device by the management device. When the authentication is executed by the portable electronic device, the authentication information may be only the authentication result. In particular, the authentication result is sent to the management device only if the portable electronic device successfully performs the authentication, which may save the cost of communication.

In 350, the process ends. In an embodiment, when the authentication result indicates an authentication failure, the portable electronic device may prompt the user to repeat the process 300 so as to avoid an authentication failure as a result of a user's misoperation. In an example, when authentication fails more than a predetermined number of times, all or some functions of the portable electronic device may be disabled. As such, it may reduce damage to the portable electronic device caused by malicious and fraudulent use by, someone.

In some embodiments, the authentication result may be notified to the user in various suitable manners, including, but not limited to, at least one of visual, audio and tactile indications. For example, when the authentication succeeds, the portable electronic device may give a prompt of e.g., "successful authentication" using a displayer or a speaker. Alternatively, the portable electronic device may also simply indicate a successful authentication by means of, e.g., a green light or a slight vibration. Alternatively or additionally, when the authentication fails, a prompt of, e.g., "authentication failure" and/or "please repeat the collection actions" may be given using a displayer or a speaker.

Figure 4:
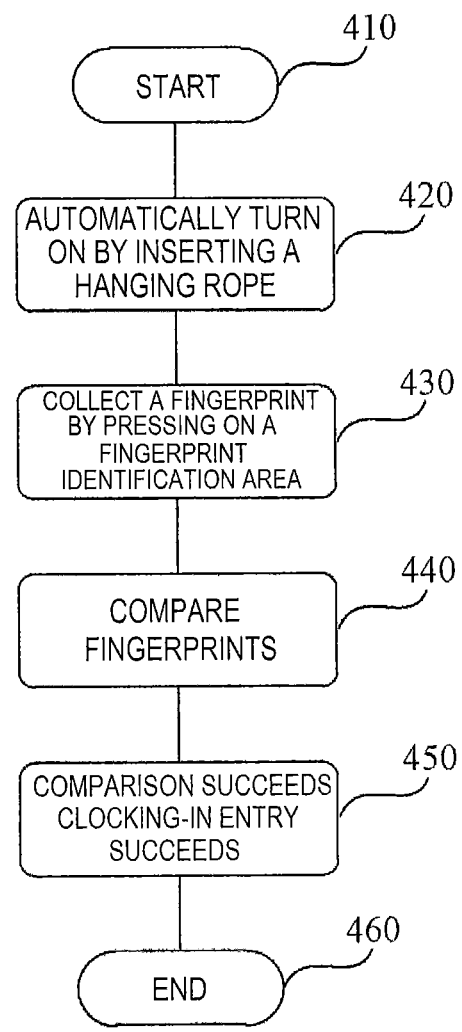
FIG. 4 illustrates a flow chart of another exemplary process according to the embodiment of the present disclosure.

FIG. 4 shows a flow chart of an exemplary process 400 for authenticating a user through the management device in a scene of work attendance check in a company by taking the e-card as an example. The e-card may be an e-card according to the embodiment of the present disclosure, such as the e-card 200 described with reference to FIG. 2.

In 410, the process starts. The e-card may be in an OFF state.

In 420, the user inserts a hanging rope into a socket of the e-card. When an engagement between the hanging rope and the socket is detected, the e-card is turned on automatically. The e-card, when being turned on, may display the information of the holder. Alternatively, the information of the holder may not be shown at the time of turning on the e-card, but shown after user authentication succeeds. In doing so, the holder's information would not be leaked to an untrusted user.

In 430, after the user carrying the e-card enters into an office area of the company, he/she may press his/her finger on the fingerprint identification area of the e-card so that the fingerprint is collected by the e-card. In some embodiments, when the e-card is outside of the office area, the fingerprint identification function of the e-card is disabled.

In 440, the collected fingerprint is compared with the fingerprint of a designated holder. In some embodiments, the fingerprint of the designated holder is stored in the e-card, so that the comparison may be done at the e-card. In some other embodiments, the e-card may send the collected fingerprint to the management device immediately after the fingerprint collection so as to make the management device perform the comparison. Additionally, the e-card may send the time of fingerprint collection as the clocking-in time to the management device.

In 450, when a result of comparison shows the two fingerprints match with each other, the management device accordingly marks the designated holder as successful clocking-in entry. When the fingerprint comparison is done at the e-card, the e-card sends a message including a comparison result, such as a successful fingerprint match, to the management, device. Additionally, the e-card may send an identifier of at least one of the designated holder and the e-card to the management device to identify the user who clocked in.

In 460, the process ends. In some embodiments, when the clocking-in succeeds, the e-card receives acknowledgement returned from the management device and thereby gives the user a corresponding indication. Alternatively or additionally, when the comparison result indicates that the two fingerprints do not match, the management device may mark the designated holder as failed clocking-in entry. At this point, the e-card will receive a negative acknowledgement returned from the management device. In this case, the e-card may prompt the user to collect the fingerprint again. Alternatively or additionally, when the number of failure to clock in by the same e-card exceeds a threshold, e.g., three times, the clocking-in function of the e-card may be disabled.

Figure 5:
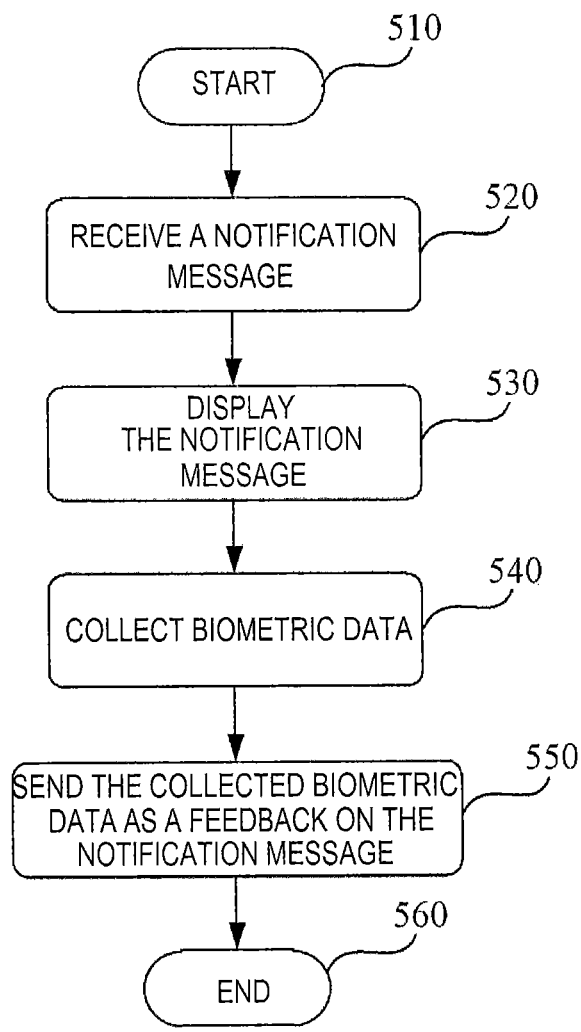
FIG. 5 illustrates a flow chart of a further exemplary process according to the embodiment of the present disclosure.

FIG. 5 illustrates the flow chart of an exemplary process 500 for receiving a notification message by taking an e-card as an example. The e-card may be an e-card according to the embodiment of the present disclosure, such as the e-card 200 described with reference to FIG. 2. In 510, the process starts. At this point, the e-card is initially turned on or has already been in an ON state. At this point, the e-card may display a main display interface, such as the identification information associated with a holder of the card, in its display area, or may display no information so as to save electrical energy.

In 520, the e-card receives the notification message from a management device. The notification message may be a broadcast message edited and released in a wireless manner by the management device. In an embodiment, the management device may select the receiver of the notification message and send the notification message directionally in a multicast or unicast manner.

In 530, the notification message is displayed in the display area of the e-card. In an embodiment, the e-card may switch its display area from the current display interface to the display of the notification message immediately after the receipt of the message. Alternatively, the e-card may only display information for message prompt in the display area, and display content of the notification message only when user's input for confirming to read the message is received, such as when the user touches a certain part of the display area or presses a particular key on the e-card. Additionally or alternatively, the user may be informed of receipt of the notification message by any other suitable manner, including, but not limited to, an audio or tactile manner. For instance, the e-card may make a sound or vibration to prompt the user: the notification message has been received.

In 540, the biometric data is collected. After the message has been displayed on the e-card, the user's biometric data may be collected to provide a feedback on the message to the management device, e.g., as a read receipt for the message. In an embodiment, a prompt, such as "do you want to confirm the receipt of the message?" may be displayed in the display area. If the user selects "yes", the user's fingerprint may be collected in, e.g., the fingerprint identification area, and in 550, the collected fingerprint may be sent as the feedback on the notification message to the management device. In an embodiment, the collected fingerprint together with a serial number of the read message, may be returned to the management device. In 560, after the read receipt for the message is submitted, the process ends, and the e-card may return to its original display interface, or the display interface is closed to enter into a low-power state.

It could be understood that, although the embodiment of the present disclosure are described in FIGS. 4 and 5 by means of the e-card, the process therein is also applicable to other portable electronic device according to the embodiment of the present disclosure, such as a mobile device or a wearable device.

The processes in FIGS. 4 and 5 are illustrated as a set of blocks of the logical flow chart, these blocks indicate the sequence of operation, and some or all of the blocks may be implemented by hardware, software or a combination thereof. In the context of software, these blocks indicate computer executable instructions stored in one or more non-transitory computer readable media (such as memories). When the computer executable instructions are executed by one or more processors, they carry out the operation.

As used herein, the terms, such as "unit", "module", "system", "interface" and/or the like are generally intended to refer to a computer-related entity, either hardware, a combination of hardware and software, software, or software in execution.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising". Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The invention claimed is:

1. A portable electronic device for authenticating a user through a management device, comprising:
   a collector configured to collect biometric data of the user;
   an authentication information generator configured to generate authentication information according to whether the portable electronic device is within an area pre-set by the management device and based on the biometric data collected by the collector in real time; and
   a communication interface configured to send the authentication information that was generated to the management device to authenticate whether the user is a registered user of the management device;
   a housing;
   a socket; and
   a collection area that is on a surface of the housing,
   wherein the socket is configured to automatically turn on the portable electronic device when a hanging rope is inserted therein, and
   wherein the collection area is configured to collect the biometric data of the user when the user is adjacent to or contacts the area.

2. The portable electronic device according to claim 1, further comprising:
   a memory configured to store biometric data of a designated holder of the portable electronic device, the designated holder comprising the registered user of the management device,
   wherein the authentication information generator comprises a comparator configured to compare the biometric data of the user with the biometric data of the designated holder when the portable electronic device is determined to be within the area pre-set by the management device, and
   wherein the authentication information generator is configured to include an indication of successful authentication in the authentication information that was generated when a result of comparison indicates that the biometric data of the user matches with the biometric data of the designated holder.

3. The portable electronic device according to claim 2, further comprising:
   a positioner configured to trace a position of the portable electronic device,
   wherein the authentication information generator is further configured to determine whether the portable electronic device is within the pre-set area based on the position obtained from the positioner.

4. The portable electronic device according to claim 2, wherein the communication interface comprises a short-range wireless interface and is configured to provide a connection-establishment indication to the authentication information generator upon establishing a communication connection with the management device via the short-range wireless interface and when the authentication information generator determines that the portable electronic device is within the pre-set area based on the indication.

5. The portable electronic device according to claim 2, wherein the indication of successful authentication comprises an indication of successful position authentication and an indication of successful biometric data authentication.

6. The portable electronic device according to claim 1,
   wherein the communication interface is further configured to receive configuration information and/or a notification message from the management device,
   wherein the configuration information comprises identification information that is specific to the registered user of the portable electronic device, and
   wherein the portable electronic device further comprises a display unit configured to display the identification information and/or the notification message.

7. The portable electronic device according to claim 6,
   wherein the configuration information comprises a template used for the identification information and/or the notification message, and
   wherein the display unit is configured to display the identification information and/or the notification message according to the template.

8. The portable electronic device according to claim 6,
   wherein the collector is further configured to collect the biometric data of the user after the display unit displays the notification message,
   wherein and the communication interface is configured to send the biometric data of the user that was collected to the management device as a feedback on the notification message.

9. The portable electronic device according to claim 1, wherein the portable electronic device comprises a card.

10. A system for authenticating a user, comprising:
    the portable electronic device according to claim 1; and
    a management device configured to authenticate whether the user is a registered user of the management device according to the authentication information from the portable electronic device.

11. A method for using a portable electronic device to authenticate a user through a management device, the method comprising:
    obtaining biometric data of the user collected in real time using the portable electronic device, wherein the portable electronic device comprises a housing, a socket, and a collection area that is on a surface of the housing;
    generating authentication information according to whether the portable electronic device is within an area pre-set by the management device and based on the biometric data of the user; and
    sending the authentication information to the management device to authenticate whether the user is a registered user of the management device;
    automatically turning on the portable electronic device when a hanging rope is inserted in the socket; and
    collecting the biometric data of the user when the user is adjacent to or contacts the collection area.

12. The method according to claim 11, wherein biometric data of a designated holder of the portable electronic device is stored in the portable electronic device, and wherein the designated holder is the registered user of the management device, the method further comprising:

comparing the biometric data of the user with the biometric data of the designated holder when the portable electronic device is determined to be within the area pre-set by the management device; and including an indication of successful authentication in the generated authentication information when a result of the comparing indicates that the biometric data of the user matches with the biometric data of the designated holder.

13. The method according to claim 11, further comprising:

tracing a position of the portable electronic device by using a positioner; and determining whether the portable electronic device is within the pre-set area based on the position obtained from the positioner.

14. The method according to claim 11, wherein the portable electronic device transmits the authentication information to the management device via a short-range wireless communication interface, the method further comprising:

determining that the portable electronic device is within the pre-set area when the portable electronic device establishes a communication connection with the management device via the short-range wireless interface.

15. The method according to claim 11, further comprising:

receiving configuration information and/or a notification message from the management device, the configuration information comprising identification information specific to the registered user of the portable electronic device; and displaying the identification information and/or the notification message.

16. The method according to claim 15, wherein the configuration information comprises a template for the identification information and/or the notification message, the method further comprising:

displaying the identification information and/or the notification message according to the template.

17. The method according to claim 15, further comprising:

collecting the biometric data of the user after the notification message is displayed, and sending the biometric data of the user that was collected to the management device as a feedback on the notification message.

18. A computer program product embodied on a non-transitory computer readable medium and comprising machine readable instructions, and when the machine readable instructions are being executed on a computing system, causing the computing system to execute the method according to claim 11.

19. A portable electronic device for authenticating a user through a management device, comprising:

a memory for storing computer executable instructions; and a processor configured to, when executing the computer executable instructions, cause the portable electronic device to perform operations comprising:

obtaining biometric data of the user collected in real time;

generating authentication information according to whether the portable electronic device is within an area pre-set by the management device and based on the biometric data of the user that was collected; and sending the authentication information to the management device to authenticate whether the user is a registered user of the management device;

wherein the portable electronic device further comprises:
a housing;
a socket; and
a collection area that is on a surface of the housing, wherein the socket is configured to automatically turn on the portable electronic device when a hanging rope is inserted therein, and wherein the collection area is configured to collect the biometric data of the user when the user is adjacent to or contacts the area.

* * * * *